(12) United States Patent
Simms et al.

(10) Patent No.: US 8,014,345 B2
(45) Date of Patent: Sep. 6, 2011

(54) INCUMBENT SPECTRUM HOLD DEVICE

(75) Inventors: Matthew E. Simms, Davie, FL (US);
Apoorv Chaudhri, Sunrise, FL (US);
Yadunandana N. Rao, Sunrise, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 923 days.

(21) Appl. No.: 11/931,748

(22) Filed: Oct. 31, 2007

(65) Prior Publication Data

US 2009/0111463 A1    Apr. 30, 2009

(51) Int. Cl.
*H04Q 7/00* (2006.01)
(52) U.S. Cl. ......................................... 370/328
(58) Field of Classification Search ................. 370/310, 370/328, 337, 338, 347; 455/403, 434, 446–457
See application file for complete search history.

(56) References Cited

U.S. PATENT DOCUMENTS

| | | | |
|---|---|---|---|
| 6,131,031 A * | 10/2000 | Lober et al. | 455/444 |
| 6,490,455 B1 | 12/2002 | Park et al. | |
| 7,103,310 B2 | 9/2006 | Lucidarme et al. | |
| 7,142,877 B2 | 11/2006 | Lipovski | |
| 7,146,176 B2 * | 12/2006 | McHenry | 455/454 |
| 7,620,396 B2 * | 11/2009 | Floam et al. | 455/434 |
| 7,756,058 B2 * | 7/2010 | Cordeiro et al. | 370/252 |
| 2002/0002052 A1 | 1/2002 | McHenry | |
| 2007/0117517 A1 * | 5/2007 | Hui et al. | 455/67.11 |
| 2007/0287465 A1 * | 12/2007 | Hyon et al. | 455/450 |
| 2008/0014880 A1 * | 1/2008 | Hyon et al. | 455/161.1 |
| 2008/0170539 A1 * | 7/2008 | Hyon et al. | 370/328 |
| 2008/0170603 A1 * | 7/2008 | Hyon et al. | 375/214 |
| 2009/0143019 A1 * | 6/2009 | Shellhammer | 455/67.11 |
| 2010/0119016 A1 * | 5/2010 | Ghosh | 375/340 |

OTHER PUBLICATIONS

PCT International Search Report Application No. PCT/US2008/080065 dated Mar. 25, 2009—13 pages.
Kuffner et al.—U.S. Appl. No. 12/059,854, filed Mar. 31, 2008 "Communication System for Exchanging Spectrum Sensing Measurements Through a Drop Box and Method of Using Same".

* cited by examiner

*Primary Examiner* — Dmitry H Levitan
(74) *Attorney, Agent, or Firm* — Barbara R. Doutre

(57) ABSTRACT

A monitoring device (141) can include a transceiver (202) to receive a radio signal, and a controller (203) communicatively coupled to the transceiver to detect an infringement on the radio signal and report the infringement to a database. One or more policies within the database can be updated to mitigate the infringement. The monitoring device can also detect whether a cognitive radio (111) is generating interference on a primary spectrum used by an incumbent device (151). Other embodiments are disclosed.

16 Claims, 4 Drawing Sheets

INCUMBENT SPECTRUM HOLD DEVICE

FIELD OF THE INVENTION

The present invention relates to mobile communication devices and, more particularly, to cognitive devices and spectrum sharing.

BACKGROUND

The explosive growth in wireless services over the past several years illustrates the huge and growing demand of the business community, consumers and the government for spectrum-based communications. Continuing advancements in technology, products and services are overwhelming the finite resources of the available communication spectrum. Industry has been forced to address dramatic changes, as it must adapt to accommodate the exponential demand on spectrum access, efficiency and reliability.

The Federal Communications Commission in the United States, and its counterparts around the world, allocate the radio spectrum across frequency channels of varying widths. One band can cover AM radio, another VH television, still others cell phones, citizen's-band radio, pagers, and so on. As more devices go wireless, they have to share a finite—and increasingly crowded—amount of radio spectrum. Although the radio spectrum is almost entirely occupied, not all devices use portions of the radio spectrum at the same time or location. At some locations or at some times of the day, a large percentage of the allocated spectrum may be sitting idle, even though it is officially accounted for.

Cognitive radio is a paradigm for wireless communication in which either a network or a wireless device changes its transmission or reception parameters to avoid interference with licensed or unlicensed users. This alteration of parameters is based on the active monitoring of several factors in the external and internal radio environment, such as radio frequency usage, user behavior and network state. Although cognitive radios implement measures to avoid selecting an occupied frequency, there are times in which they may accidentally or unintentionally interfere with an incumbent device—a device authorized to use those frequencies of the radio spectrum. This can damage the incumbent device and/or reduce its signal reception quality. A need therefore exists to protect the incumbent devices from interference generated by the cognitive radios.

SUMMARY

In a first embodiment of the present disclosure, a monitoring device can include a transceiver to receive a radio signal, and a processor communicatively coupled to the transceiver to detect an interference on a primary spectrum of the radio signal, wherein the interference is caused by a cognitive radio in a vicinity of the CR monitoring device, and report the interference to a database for mitigating the interference caused by the cognitive radio. In one arrangement, the processor by way of the transceiver can log the interference to the database accessible to a CR base station, thereby notifying the CR base station of the interference. In a second arrangement, the processor by way of the transceiver can emit a beacon signal to report to cognitive devices in the vicinity that an infringement has been detected on a frequency of the primary spectrum.

In a second embodiment of the present disclosure, a cognitive radio (CR) base station managing a plurality of cognitive devices can comprise a transceiver, and a processor communicatively coupled to the transceiver to receive an infringement from a CR monitoring device, evaluate a transmit operation of the plurality of cognitive devices in view of the infringement based on access policies retrieved from a database, and update the access polices to manage operation of the plurality of cognitive devices to mitigate the infringement. The processor can retrieve the infringement in response to the CR monitoring device logging the interference to the policy database, or by way of a beacon signal transmitted by the CR monitoring device identifying the interference. The infringement can identify at least one among a channel or frequency on which an interference was detected, a change in power spectrum levels, historical power spectrum levels, interference patterns, a time the interference was detected, a duration of the interference, and a location of the CR monitoring device.

In a second embodiment of the present disclosure, a Cognitive Radio (CR) can have a processor that establishes a transmit operation based on access policies retrieved from a database, and that responsive to receiving an infringement from a CR monitoring device adjusts the transmit operation to mitigate the infringement caused by the transmit operation. The CR can receive the infringement by way of a beacon signal transmitted by an incumbent device or by way of a base station directing the CR to cease operation in response to receiving the infringement via an update of the access policies in the database.

BRIEF DESCRIPTION OF THE DRAWINGS

The features of the system, which are believed to be novel, are set forth with particularity in the appended claims. The embodiments herein, can be understood by reference to the following description, taken in conjunction with the accompanying drawings, in the several figures of which like reference numerals identify like elements, and in which:

DETAILED DESCRIPTION

Figure 1:
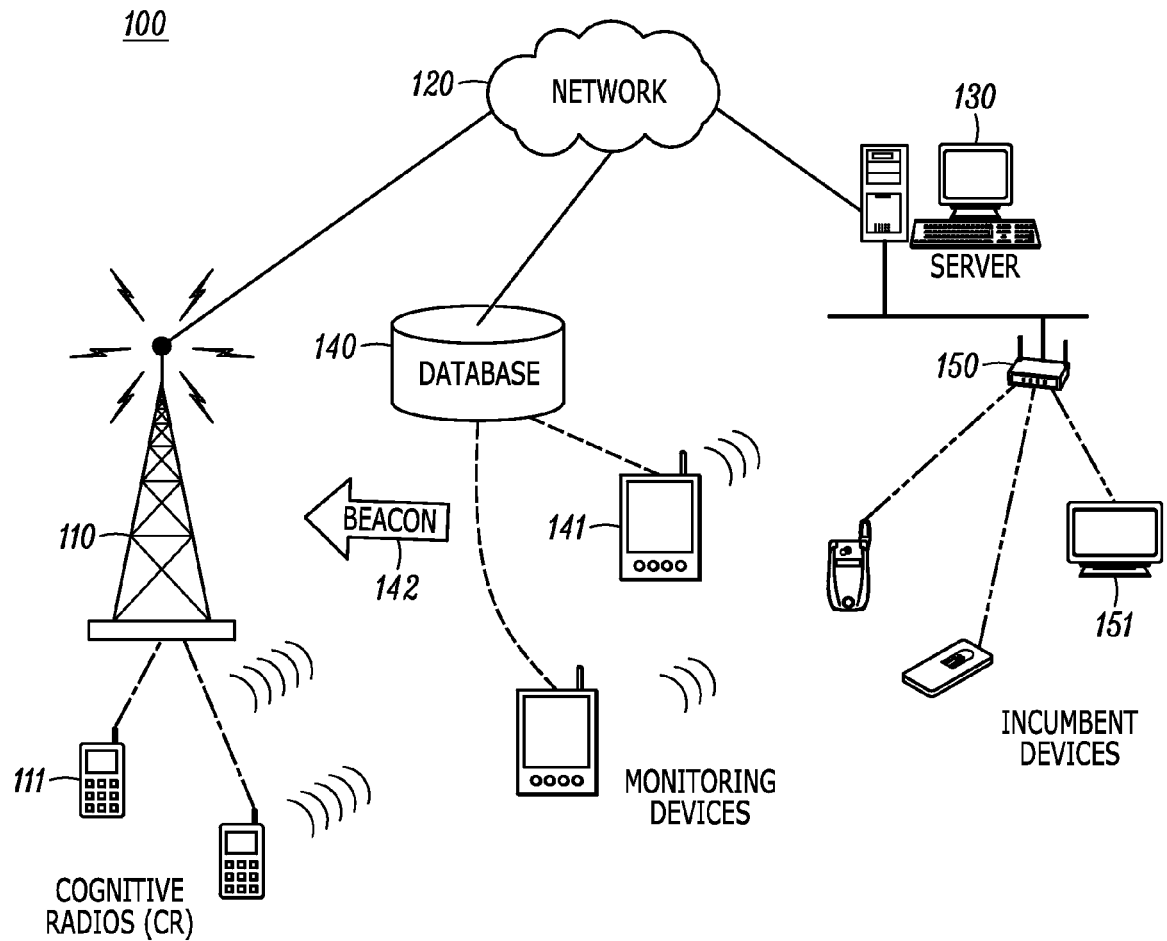
FIG. 1 is an exemplary diagram of a communication system in accordance with an embodiment of the invention.

While the specification concludes with claims defining the features of the embodiments of the invention that are regarded as novel, it is believed that the method, system, and other embodiments will be better understood from a consideration of the following description in conjunction with the drawing figures, in which like reference numerals are carried forward.

As required, detailed embodiments of the present method and system are disclosed herein. However, it is to be understood that the disclosed embodiments are merely exemplary, which can be embodied in various forms. Therefore, specific structural and functional details disclosed herein are not to be interpreted as limiting, but merely as a basis for the claims and as a representative basis for teaching one skilled in the art to variously employ the embodiments of the present invention in virtually any appropriately detailed structure. Further, the terms and phrases used herein are not intended to be limiting but rather to provide an understandable description of the embodiment herein.

FIG. 1 depicts an exemplary embodiment of a communication system 100. The communication system 100 can provide connectivity to one or more communication devices (e.g., cognitive radios (CR) 111, monitoring devices 141, incumbent devices 151) over a radio frequency (RF) communication network, a wireless local area network (WLAN), or any other suitable communication network. In a WLAN implementation, the physical layer of the can use a variety of technologies such as 802.11b or 802.11g Wireless Local Area Network (WLAN) technologies. The physical layer may use infrared, frequency hopping spread spectrum in the 2.4 GHz band, direct sequence spread spectrum in the 2.4 GHz Band, or any other suitable communication technology. In a WLAN environment, the communication devices can communicate directly with one another in an ad-hoc community, peer-to-peer or mesh network.

In a RF implementation, the base station 110 can provide RF connectivity to the one or more CRs 111. Communication within the RF communication network can comply with a standard communication protocol such as CDMA, GSM, or Wi-MAX, or any other suitable communication protocol. The server 130 can host monitoring application services for the monitoring devices 141. Applications can include tracking and identifying CRs 111 within a geographic location or within a vicinity of the incumbent devices 151.

The network 120 can include a circuit switched network such as the Public Switched Telephone Network (PSTN) or a packet switched network such as a Voice over Internet Protocol (VoIP) network. The network 120 can also operate with system components providing cable, satellite, IPTV signals and any associated system components (e.g. media gateways, routers, access points, servers, etc.)

The CRs 111 can communicate amongst one another over one or more frequency channels supported in the communication system 100. As cognitive devices, the CRs 111 can operate using one or more channels of an unlicensed spectrum. They can determine which frequencies are quiet and pick one or more frequencies over which to transmit and receive data. Instead of each radio having to tell its neighbor what it is doing, it observes its neighbors to see if they are transmitting and in response makes its own decisions. Although the CRs 111 attempt to identify channels already in use before selecting an unused channel, they may accidentally transmit on a used channel, or cause interference on an adjacent channel. Because the CRs 111 may not be aware that they are transmitting on a used channel or causing interference, the monitoring devices 141 can detect interference and proactively inform the CRs 111 of the interference they are causing. In one arrangement the monitoring devices 141 can be placed in open area to simply monitor the presence of CRs 111 at a particular location.

Broadly stated, the monitoring device 141 can protect the incumbent device. If it is connected to the incumbent device 151, then apart from independently sensing, the monitoring device 141 can also receive signal quality estimation (SQE) information from the incumbent device 151 itself. In this arrangement, the incumbent device 151 can also control the monitoring device 141. In another arrangement, the monitoring devices 141 can also be placed in a vicinity of the incumbent devices 151. The monitoring devices 141 alone or in combination can detect whether the CRs 111 are generating interference with the primary spectrum of the incumbent devices 111. This serves to protect the receivers of the incumbent devices 151. The monitoring devices 141 can determine and report if a CR 111 in the vicinity of the incumbent devices 151 is transmitting on one or more used channels of a frequency band. The monitoring devices 141 on their own can transmit via beacon signals 142 or wireline connections to identify detected communication devices generating interference.

The monitoring device 141 can also include information about the bandwidth it examines during monitoring operations. It should also be noted that the monitoring device 141 is applicable to other bands besides Television wideband signals (TVWS). For instance, the monitoring device 141 can also operate on radio frequency bands including AM broadcast, shortwave, CB, TV, FM, aircraft, L band, military bands, marine bands, and K bands but are not limited to these. Furthermore, cognitive access and clearance can be provided to the monitoring device 141 on marine frequencies.

As one example, an incumbent device 151 can be a television that receives UHF/VHF communication signals over the air or an IPTV that receives media signals from a media device 150 (e.g. set-top box) over a packet based connection. As another example, the incumbent device 151 can be a media control (e.g. remote control) to control a media device by way of the set-top box. As yet another example, the incumbent device 151 can be a telephone, such as a wireless landline phone in a household. Further, the incumbent device 151 can be a portable music player, a laptop, a media player, or any other suitable communication device, for example, one capable of receiving media via a Wi-Fi connection from the media device 150 (e.g. IEEE 802.X access point, router, hub, etc.) The incumbent device 151 can also connect directly to the network 120 via PSTN, cable network, or satellite system. In one arrangement, the monitoring device 141 can be mounted on a roof or attic, to improve the chance of detecting interference from the incumbent device 151 and mitigating the interference. In this arrangement, the monitoring device 141 can include the PSTN or ethernet connection as well as a beaconing antenna to connect to the server 130 for permitting monitoring applications. The monitoring device 141 can also be attached to the incumbent devices 151 in addition to being co-located with the incumbent devices 151.

Whereas the incumbent devices 151 are authorized to use the primary spectrum, the CRs 111 are not permitted to interfere with a channel of the primary spectrum when it is used by the incumbent devices 151. Accordingly, the monitoring devices 141 can detect the interference on the primary spectrum of a radio signal, and report the interference to the base station 1) by way of a direct beacon signal 142, or 2) by way of the database 140. In the former, the monitoring devices 141 can transmit a beacon signal 142 indicating an infringement has been detected, for example, an interference on a channel. Moreover, the monitoring device 141 can proactively direct the beacon signal 142 to a specific CR 111 responsive to detecting a cognitive radio signature signal transmitted from that specific CR 111. The beacon signal 142 can contain channel information, location, and other interference related parameters. In the latter, the monitoring device 141 can update the database 140 with interference related information to indirectly inform the base station 110. The base station 110 can access the database 140 to retrieve the periodically updated interference information. In such regard, a first cognitive system can monitor another cognitive system for offenses, to improve its own ability to provide good service to its users by avoiding incumbents.

The database 140 can include one more access policies which are provided to protect incumbent devices 151 in the communication system 100. The access policy can identify which frequencies (e.g. channels) are available and those that are not available for use in the communication system 100. For instance, the incumbent devices 151 may subscribe to a service that permits them to communicate over a frequency channel, and that guarantees a service quality level. The access policies can identify which frequencies are assigned to, or used by, the incumbent devices 151 as a measure to publicize to CRs 111 which channels are used. The base station 110 can review the access policies in the database 140 and manage the CRs 111 in the communication system 100 to prevent or mitigate interference with the incumbent devices 151. For example, in view of the access policies, the base station 110 can direct the CRs 111 to either transmit or not transmit on an channel, or adjust a power level of a transmit operation. The base station 110 can also update the access policies in view of feedback provided by the one or more monitoring devices 141.

Figure 2:
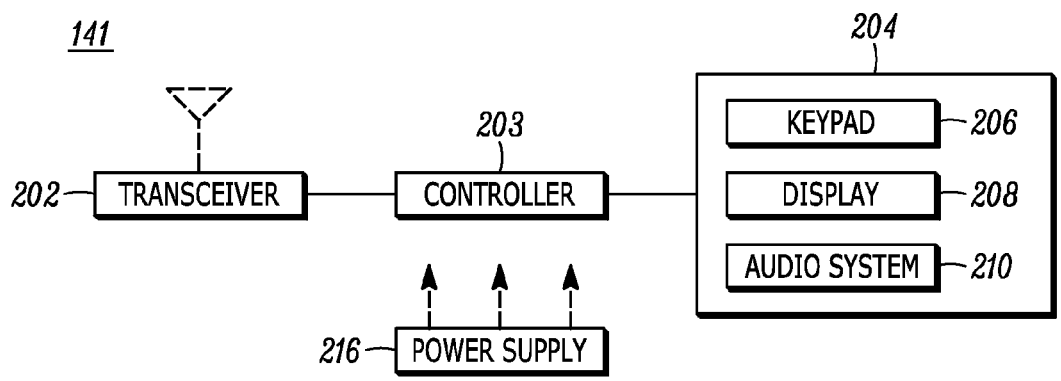
FIG. 2 is an exemplary schematic of a monitoring device in accordance with an embodiment of the invention.

FIG. 2 depicts an exemplary embodiment of the monitoring device 141. In one embodiment, the monitoring device 141 can be equipped with an IEEE 802.11 compliant wireless medium access control (MAC) chipset. IEEE 802.11 specifies a WLAN standard developed by the Institute of Electrical and Electronic Engineering (IEEE) committee. The standard does not generally specify technology or implementation but provides specifications for the physical (PHY) layer and Media Access Control (MAC) layer. The standard allows for manufacturers of WLAN radio equipment to build interoperable network equipment.

The monitoring device 141 can comprise a wireless or wireline transceiver 202, a user interface (UI) 204, a power supply 216, and a controller 203 for managing operations of the foregoing components. The transceiver 202 can utilize common communication technologies to support singly or in combination any number of wireline access technologies such as cable, xDSL, Public Switched Telephone Network (PSTN), and so on. With respect to FIG. 1, as one example, the transceiver 202 can report antenna height in the beacon 142 or in a packet that is logged to the database 140. In one arrangement, the transceiver 202 can be a dumb transmitter that is programmed by the incumbent device 151, for example, based on the incumbent's SQE mechanism. This allows for a low cost monitoring device that can be deployed easily. The controller 203 can utilize computing technologies such as a microprocessor and/or digital signal processor (DSP) with associated storage memory such a Flash, ROM, RAM, SRAM, DRAM or other like technologies for controlling operations of the monitoring device 141.

Singly or in combination with the wireline technology, the transceiver 102 can support any number of wireless access technologies including without limitation Digital Enhance Cordless Telecommunications (DECT), Bluetooth™, Wireless Fidelity (WiFi), Worldwide Interoperability for Microwave Access (WiMAX), Ultra Wide Band (UWB), software defined radio (SDR), and cellular access technologies such as CDMA-1×, W-CDMA/HSDPA, GSM/GPRS, TDMA/EDGE, and EVDO. SDR can be utilized for accessing public and private communication spectrum with any number of communication protocols that can be dynamically downloaded over-the-air to the monitoring device 141. It should be noted also that next generation wireline and wireless access technologies can also be applied to the present disclosure.

The UI element 204 can include a keypad 206 with depressible or touch sensitive keys and a navigation element such as a navigation disk, button, roller ball, or flywheel for manipulating operations of the monitoring device 141. The UI element 204 can further include a display 208 such as monochrome or color LCD (Liquid Crystal Display) which can be touch sensitive for manipulating operations of the monitoring device 141 and for conveying images to the end user of said device, and an audio system 210 that utilizes common audio technology for conveying and intercepting audible signals of the end user.

The power supply 216 can utilize common power management technologies such as replaceable batteries, supply regulation technologies, and charging system technologies for supplying energy to the components of the monitoring device 141 and to facilitate portable applications. Depending on the type of power supply 216 used, the monitoring device 141 can represent an immobile or portable communication device.

The monitoring device 141 can represent a single operational device or a family of devices configured in a master-slave arrangement. In the latter embodiment, the components of the monitoring device 141 can be reused in different form factors for the master and slave terminal devices 100. The monitoring device 141 can also be represented by any number of communication devices including without limitation a laptop computer, a desktop computer, a cell phone, a personal digital assistant, a set-top-box (STB), or a cordless phone just to name a few. Additionally, each of the monitoring devices 141 can be addressed by one or more communication identifiers.

Figure 3:
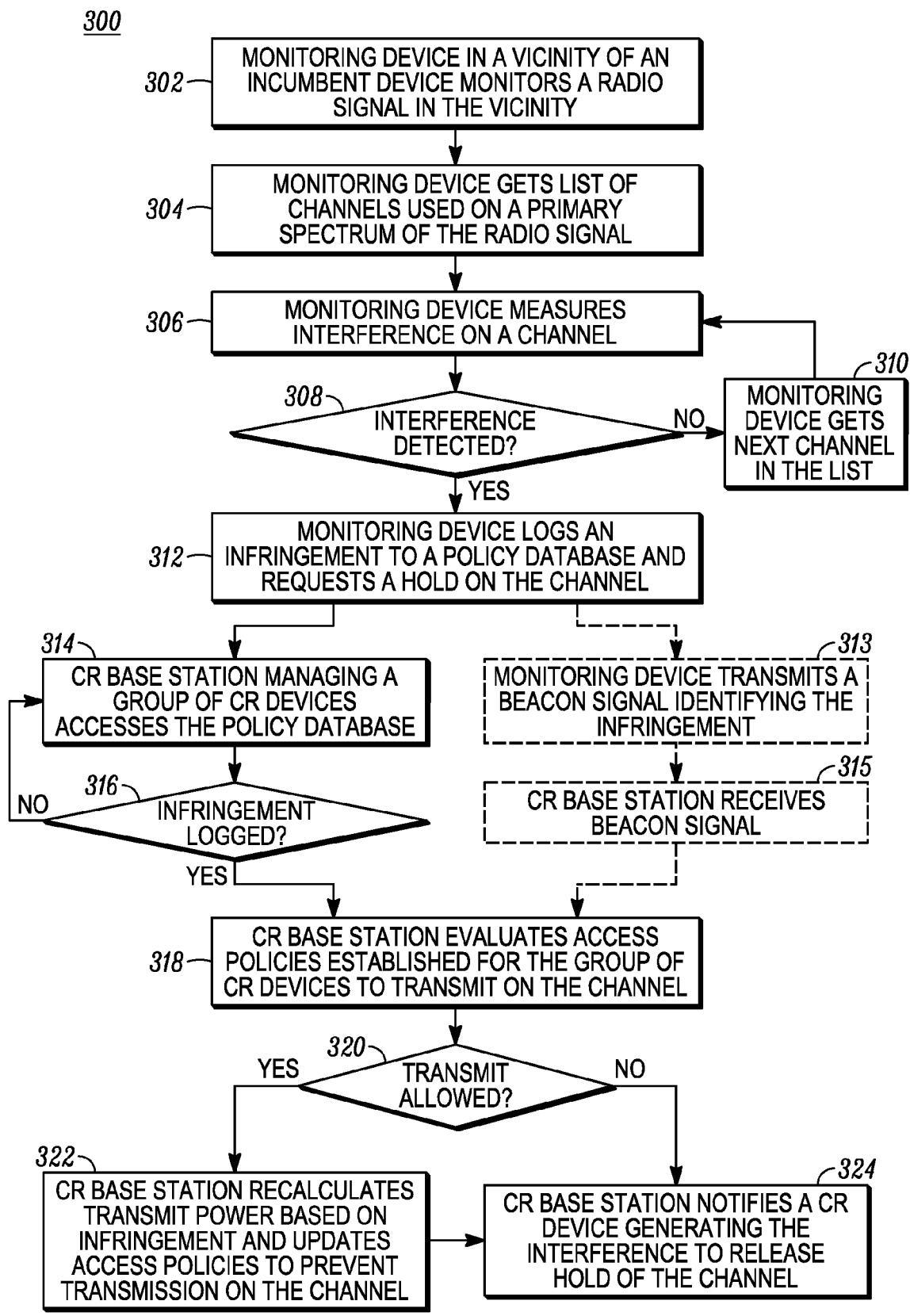
FIG. 3 is an exemplary flowchart illustrating a method for managing cognitive devices operating in a communication system in accordance with an embodiment of the invention.

FIG. 3 depicts an exemplary method 300 operating in portions of the communication system 100. When describing method 300, references will be made to FIGS. 1 and 2, although it is understood that method 300 can be implemented in other suitable embodiments. It should also be noted that method 300 can include more or less steps and is not limited to the order of steps shown.

Although the method 300 is described in the context of a monitoring device 141 that detects a CR 111 generating an interference with an incumbent device 151, it should be noted that the monitoring device 141 can detect the CR 111 regardless if the incumbent device 151 is present or not. With this in mind, method 300 can begin with step 302 in which the monitoring device 141 is in a vicinity of an incumbent device 151 and monitors a radio signal in the vicinity. The radio signal may be associated with the incumbent device or any other communication device such as a CR 111 within the vicinity. As previously noted, the monitoring device 141 can determine if any CRs 111 within the vicinity are causing interference on a primary spectrum of the radio signal held (e.g. reserved, used, requested, acquired) by the incumbent device 151. The incumbent device 151 is also capable of understanding the monitoring device 141 (e.g., common communication interface), and can let the user know the interference is from a known source (that it detected) and that the interference is being mitigated through the monitoring devices mechanisms (e.g., beacon 142 or wireline).

In such an arrangement, the monitoring device 141 can determine when one or more CRs 111 are operating in the vicinity using an unlicensed technology on a licensed spectrum. Although the CRs 111 attempt to avoid transmitting on an used channel, they may unintentionally transmit or cause interference on a channel used by the incumbent device 151. For example, the CRs 111 may employ geo-location, Global Positioning System (GPS), sensing, and power control to avoid transmitting on a frequency used by the incumbent device 151. However, these measures performed alone by the CRs 111 themselves may not be robust metrics to completely assess interference issues.

Figure 4:
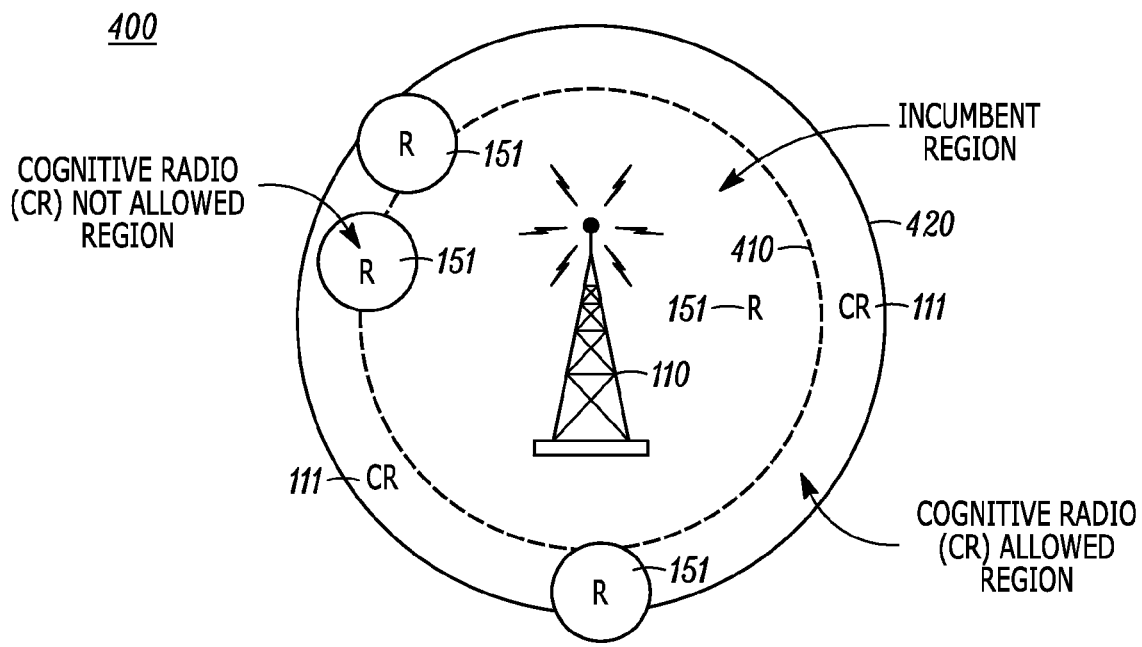
FIG. 4 is an exemplary contour boundary diagram for cognitive devices in accordance with an embodiment of the invention.

For example, referring to FIG. 4 a pictorial diagram 400 illustrating contour boundaries of a cognitive radio environment is shown. As illustrated, the geographic location of the base station 110 can provide broad coverage in all directions, noted by the circular contour boundary. However, the signal reception can change based on the terrain, weather, power level, and type of objects (e.g. buildings) within the region of the geographic location. As shown, the incumbent region 410 corresponds to the area in which incumbent devices 151 are permitted to operate and possibly assured a service quality level. CRs 111 are not generally permitted to operate in the incumbent region since they can cause interference and degrade the service quality level. In the incumbent region 410, the base station 110 can provide coverage in compliance with Federal Communications Committee (FCC) regulations to the one or more incumbent devices 151. FCC coverage can be defined as a communication signal power level measured to be greater than approximately −116 dB.

The CRs 111 are however permitted to operate outside of the incumbent region 410—beyond the incumbent region 410 up until the boundary 420—with some restrictions. For example, the CRs 111 can operate freely within this region (between the incumbent region 410 and boundary 420) if no incumbent devices 151 are in this region (e.g. "CR allowed region). Although the signal level may be lower (<−116 dB) within the "CR allowed region" (e.g. boundary 420) it may still be sufficient to provide reception coverage to the incumbent device 151 when in this region. However, if an incumbent device 151 enters this region, even though it is outside the incumbent region 410, the CRs 111 are not permitted to operate within a certain range (e.g. "CR not allowed region") of the incumbent device 151. More specifically, the CRs 111 are not permitted to generate interference within a certain range (shown as a radius around R) of the incumbent device 151.

With that in mind, referring back to FIG. 3, at method step 304, the monitoring device 141 gets a list of channels used on a primary spectrum of the radio signal. The list can be supplied by the user, or generated in response to a channel scanning. The monitoring device 141 can scan channels in the radio spectrum range (3 Hz to 30 GHz) and also the microwave spectrum range (9300 MHz to 300 GHz). At step 306, the monitoring device 141 measures interference on a channel. For example, the controller 203 (see FIG. 2) of the monitoring device 141 can perform signal processing operations (e.g. Filterbank, Fast Fourier Transform, etc.) on the radio signal to generate a power spectrum. The controller 203 can analyze the power spectrum to identify changes in power level among one or more frequency bands. As an example, the monitoring unit 141 can average the power spectrum over time, and compare it to current power spectrum measurements. Significant spectrum level changes in a frequency band can be indicative of an interference. In one arrangement, the controller 203 in view of the spectrum level changes can detect interference based on adaptive frequency level thresholds.

If the monitoring device 141 does not detect an interference at step 308, it proceeds to scan through other channels in the list as shown in step 310. When the monitoring device 141 does detect an interference at step 308, it logs an infringement to the policy database 140, as shown in step 312. Notably, the monitoring device 141 indirectly informs the base station 110 by logging the infringement to the policy database 140. The infringement can identify the channel or frequency on which the interference was detected, interference power spectrum levels, historical power spectrum levels, interference patterns, the time the interference was detected, a duration of the interference, a location of the monitoring unit 141, contour information related to the location, or any other information related to the interference. The infringement can also indicate that the monitoring device 141 requests a hold of the primary spectrum. That is, the monitoring device 141 can specifically request that no CRs 111 within the vicinity transmit on a channel currently used by an incumbent device 151.

In addition to logging the interference as an infringement in the policy database 140 (or, as an alternative step apart from step 312), the monitoring device 141 can transmit a beacon signal 142 (see FIG. 1) as shown in step 313. The beacon signal 142 can be transmitted within the vicinity to describe the infringement (e.g. interference level, frequency, location, etc.). Devices within the vicinity can receive the beacon signal and react accordingly. For example, a CR 111 upon receiving the beacon signal 142 can determine whether it is operating at the interfering frequency, and if so, adjust operations accordingly. Moreover, the monitoring device 141 can specifically direct the beacon signal 142 to a particular CR 111 responsive to detecting a cognitive radio signature signal from that particular CR 111. For instance, each CR 111 may modify spectrum levels in accordance with a specific pattern characteristic to the particular CR 111. The monitoring device 141 upon analyzing the spectrum can learn to identify the CR 111 by their particular signature signal and address a beacon signal to that CR 111. For example, the beacon signal can include a header identifying the name of the CR 111 to distinguish the CR 111 in the group. In another arrangement, expressed in step 315, the base station 110 can receive the beacon signal and adjust operations of the group of CRs 111 it manages. For instance, if the monitoring device 141 cannot identify the particular CR 111, it can transmit the beacon signal 142 to the base station 110 to handle the interference.

Upon the monitoring device 141 logging the interference in the database 140 at step 312, the base station 110 then accesses the policy database 140, as shown by step 314. The base station 110 can access the policy database 140 from time to time as different monitoring devices 141 update the database 140 with new infringements. If at step 316, the base station 110 reviews the updated information within the policy database 140 and determines an interference has been logged, the base station 110 access the policies established for the group of CRs 111 it manages with regard to the interference, as shown in step 318. Recall the policies establish rules for how the CRs 111 can operate in the communication system 100. The base station 110 based on the polices established and in view of infringements submitted by the monitoring devices 141 updates the contour boundaries for the group of CRs 111 it manages.

Figure 5:
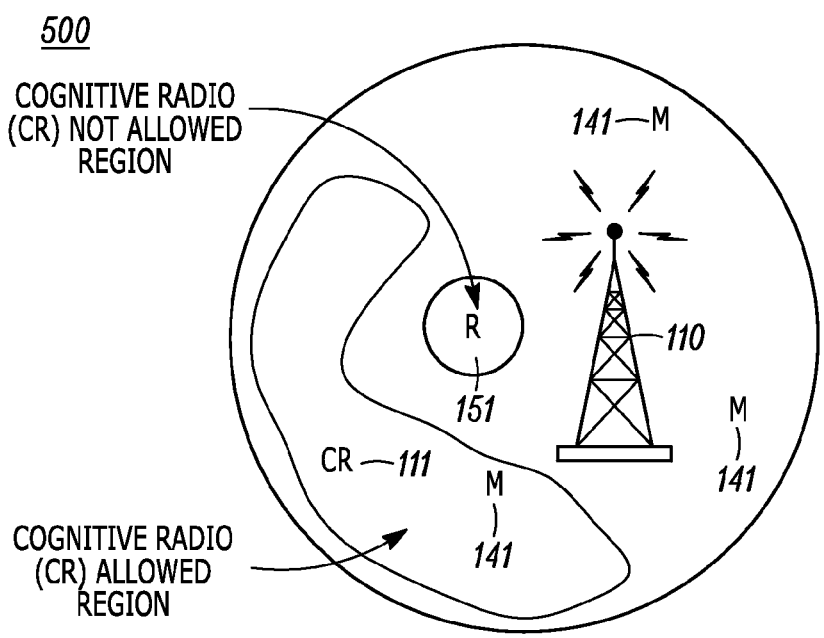
FIG. 5 is another exemplary adapted contour boundary diagram for cognitive devices in accordance with an embodiment of the invention.

Briefly referring to FIG. 5, a pictorial diagram 500 illustrating a contour boundary established in response to infringement feedback provided by monitoring devices 141 is shown. As illustrated, the monitoring devices 141 (shown as M) when dispersed in the communication environment 100 can indirectly change the contour of the CR allowed region. For example, upon a monitoring device 141 identifying transmissions from one or more incumbent devices 151 in the CR allowed region (see 410, FIG. 4) the monitoring device 141 reports the transmissions to the base station 110. The base station 110 in turn, establishes a contour for a "CR not allowed region" that restricts operation of CRs 111 within a particular range of the incumbent device 151, and adjusts the contour of the previous "CR allowed region" (shown as half-moon contour).

Returning back to FIG. 3, upon the base station 110 evaluating the policies in view of the infringements at step 318, the base station 110 determines if a transmit operation is allowed on any of the CR 111 channels, as shown in step 320. If the transmit is allowed, this indicates that the CR 111 causing the interference followed proper policy procedure. Accordingly, the base station 110, in an effort to prevent other CRs 111 from generating interference, recalculates a transmit power based on the infringement and updates the access policies to prevent transmission on that same channel. Notably, the CRs 111 abide by the policies established by the base station 110 to avoid transmitting on an occupied channel or on an adjacent channel that causes interference.

If however at step 320 the transmit operation is not allowed for the CRs 111, the base station 110 at step 324 notifies a CR device generating the interference to release hold of the channel. This situation can occur when the CR 111 device itself acquires an inaccurate measurement during channel scans in its own area, for example, due to geographical conditions or obstacles, and in which it fails to detect an incumbent device 151 in the area. Although the policies in the database 140 may indicate that there are no incumbents in the area, and the CRs 111 own readings indicate the same, an incumbent device 151 may in fact have entered the area prior to detection. In such situations, when an infringement is reported, the base station 110 immediately informs the CR 111 to stop transmitting. The method can continue back to starting step 302.

It would be evident to an artisan with ordinary skill in the art that the aforementioned embodiments can be modified, reduced, or enhanced without departing from the scope and spirit of the claims described below. For example, the monitoring devices 141 can be placed in the vicinity of a media system including an television to identify whether a cognitive device on the premise is causing interference with the television. Moreover, the monitoring devices 141 can be operatively coupled to a stationary object such as a building or a moving object such as a vehicle Other modifications can be applied to the present disclosure without departing from the scope of the claims. Accordingly, the reader is directed to the claims below for a fuller understanding of the breadth and scope of the present disclosure.

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

Figure 6:
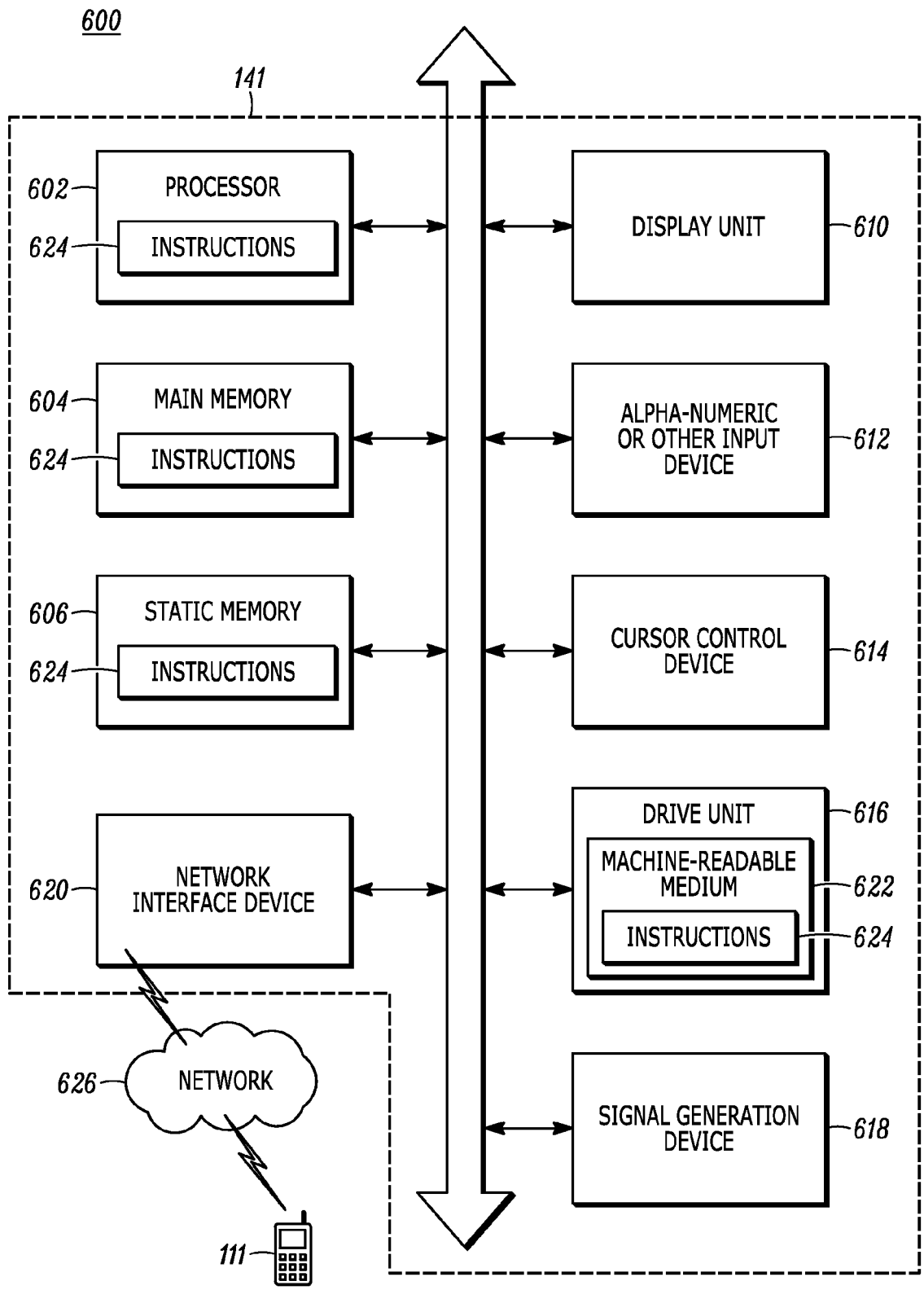
FIG. 6 depicts an exemplary diagrammatic representation of a machine in the form of a computer system within which a set of instructions, when executed, may cause the machine to perform any one or more of the methodologies disclosed herein.

For example, FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

While the preferred embodiments of the invention have been illustrated and described, it will be clear that the embodiments of the invention is not so limited. Numerous modifications, changes, variations, substitutions and equivalents will occur to those skilled in the art without departing from the spirit and scope of the present embodiments of the invention as defined by the appended claims.

What is claimed is:

1. A monitoring device comprising
a transceiver to receive a radio signal; and
a processor communicatively coupled to the transceiver to
monitor for and detect an interference on a primary spectrum of the radio signal, wherein the interference is caused by a cognitive radio (CR) in a vicinity of the monitoring device, and
report the interference as an infringement to a database, the processor of the monitoring device by way of the transceiver logging the interference to a policy database accessible to a CR base station that manages cognitive devices in the vicinity thereby notifying the CR base station of the infringement, the CR base station managing the cognitive devices in the vicinity by establishing and adjusting contours for CR allowed regions and contours for CR not allowed regions based access policies and the logged interference; and
continue monitoring and updating the database periodically with new detected interference information such that the contours for CR allowed regions and contours for CR not allowed regions are readjusted for cognitive devices in the vicinity.

2. The monitoring device of claim 1, wherein the processor by way of the transceiver emits a beacon signal to report that an infringement has been detected on a frequency of the primary spectrum.

3. The monitoring device of claim 1, wherein the processor identifies a cognitive radio signature signal of a cognitive radio and addresses a beacon signal to that cognitive radio, the beaconing signal causing the cognitive radio to modify spectrum levels in accordance with a specific pattern characteristic.

4. The monitoring device of claim 1, wherein at least one cognitive device accesses a policy database to determine if the at least one cognitive device is transmitting on a frequency in the vicinity and causing the interference.

5. The monitoring device of claim 1, wherein the processor by way of the transceiver notifies an incumbent device holding the primary spectrum that a cognitive device in the vicinity is producing the interference on the primary spectrum.

6. The monitoring device of claim 1, wherein the processor scans a list of channels in the vicinity, measures the interference in the channels, and reports the interference to the database if the interference exceeds a threshold.

7. The monitoring device of claim 1, wherein the processor reports to the CR base station at least one communication channel experiencing interference.

8. The monitoring device of claim 1, wherein the processor reports to frequencies used in the vicinity, a duration and time of the interference on the frequencies, and interference levels on the frequencies.

9. The monitoring device of claim 1, further comprising a Global Positioning System (GPS) to identify a location of the monitoring device, wherein the processor by way of the transceiver
transmits the location to the CR base station, and
reports contour information related to the location.

10. A cognitive radio (CR) base station managing a plurality of cognitive devices, the CR base station comprising:
a transceiver; and
a processor communicatively coupled to the transceiver to
receive an infringement from a CR monitoring device;
evaluate a transmit operation of the plurality of cognitive devices in view of the infringement based on access policies retrieved from a database;
update the access policies to manage operation of the plurality of cognitive devices to mitigate the infringement; and
repeating the evaluation and updates to manage the operation of the
plurality of cognitive devices so as avoid interference with incumbents; and wherein the CR base station managing the plurality of cognitive devices forms a first cognitive system which monitors another cognitive system for infringements to avoid interference with incumbents.

11. The CR base station of claim 10, wherein the processor retrieves the infringement in response to the CR monitoring device logging the interference to the policy database.

12. The CR base station of claim 10, wherein the processor receives the infringement by way of a beacon signal transmitted by the CR monitoring device identifying the interference.

13. The CR base station of claim 10, wherein the infringement identifies at least one among a channel or frequency on which an interference was detected, a change in power spectrum levels, historical power spectrum levels, interference patterns, a time the interference was detected, a duration of the interference, and a location of the CR monitoring device.

14. The CR base station of claim 13, wherein the processor receives the infringement by way of a beacon signal transmitted by the CR monitoring device identifying the interference.

15. The CR base station of claim 10, wherein the processor recalculates a transmit power based on the infringement and updates the access policies to prevent transmission on the channel identified in the infringement.

16. A Cognitive Radio (CR), comprising:
a processor;

a transmitter;
a receiver; and
the processor and transmitter establishing a transmit operation based on access policies retrieved from a database, and that responsive to receiving an infringement from a CR monitoring device the processor adjusts the operation to mitigate the infringement caused by the transmit operation, the adjustment in operation allowing the infringing device to become non-infringing device by establishing and adjusting contours for CR allowed regions and contours for CR not allowed regions based the access policies and the received infringement.

* * * * *